US011131485B2

(12) United States Patent
Tang

(10) Patent No.: US 11,131,485 B2
(45) Date of Patent: Sep. 28, 2021

(54) MULTI-SPLIT SYSTEM AND LIQUID RETURN PREVENTION CONTROL METHOD THEREOF DURING DEFROSTING OF MULTI-SPLIT SYSTEM

(71) Applicants: GD Midea Heating & Ventilating Equipment Co., Ltd., Foshan (CN); Midea Group Co., Ltd., Foshan (CN)

(72) Inventor: Changjing Tang, Foshan (CN)

( * ) Notice: Subject to any disclaimer, the term of this patent is extended or adjusted under 35 U.S.C. 154(b) by 81 days.

(21) Appl. No.: 16/121,643

(22) Filed: Sep. 5, 2018

(65) Prior Publication Data

US 2019/0063793 A1 Feb. 28, 2019

Related U.S. Application Data

(63) Continuation of application No. PCT/CN2017/084224, filed on May 12, 2017.

(30) Foreign Application Priority Data

Nov. 7, 2016 (CN) ........................ 201610978531.7

(51) Int. Cl.
*F25B 41/06* (2006.01)
*F25B 13/00* (2006.01)
(Continued)

(52) U.S. Cl.
CPC .............. *F25B 13/00* (2013.01); *F25B 41/20* (2021.01); *F25B 41/31* (2021.01); *F25B 43/006* (2013.01);
(Continued)

(58) Field of Classification Search
CPC ...... F25B 41/04; F25B 41/062; F25B 43/006; F25B 2313/0233
See application file for complete search history.

(56) References Cited

U.S. PATENT DOCUMENTS

2016/0273816 A1* 9/2016 Horiuchi ............... F25B 47/025
2017/0268791 A1* 9/2017 Luo ...................... F25B 41/003

FOREIGN PATENT DOCUMENTS

WO WO-2006112322 A1 * 10/2006 ............. F25B 13/00

OTHER PUBLICATIONS

Hideki Sangenya, Air Conditioner, Apr. 12, 2006, Full Document (Year: 2006).*

* cited by examiner

*Primary Examiner* — Elizabeth J Martin
*Assistant Examiner* — Nael N Babaa
(74) *Attorney, Agent, or Firm* — Kilpatrick Townsend & Stockton

(57) ABSTRACT

A multi-split system and a liquid return prevention control method thereof during defrosting of the multi-split system. The method includes the following steps: when the multi-split system is in heating operation, detecting gas exhaust pressure (PC), gas return pressure (PE) and gas exhaust temperature (TP) of a compressor in real time; if an outdoor unit receives a defrosting instruction, sending a defrosting signal to a diverter and heating indoor units in multiple indoor units, controlling, by means of the diverter, a throttling element (EXV2) to close before first reversing of a four-way valve and last for a pre-set time, so as to reduce the amount of a refrigerant returned to the outdoor unit; and regulating the opening of the throttling element (EXV2) according to the gas exhaust pressure (PC), gas return pressure (PE) and gas exhaust temperature (TP) during defrosting operation of the multi-split system, so that the risk of liquid return occurred to the compressor during a defrosting process, and the safety and reliability of the system are greatly improved.

5 Claims, 2 Drawing Sheets

(51) Int. Cl.
*F25B 43/00* (2006.01)
*F25B 47/02* (2006.01)
*F25B 49/02* (2006.01)
*F25B 41/20* (2021.01)
*F25B 41/31* (2021.01)

(52) U.S. Cl.
CPC ............ *F25B 47/025* (2013.01); *F25B 49/02* (2013.01); *F25B 2313/0231* (2013.01); *F25B 2313/0233* (2013.01); *F25B 2313/0253* (2013.01); *F25B 2313/02741* (2013.01); *F25B 2400/23* (2013.01); *F25B 2600/2509* (2013.01); *F25B 2600/2513* (2013.01); *F25B 2700/1931* (2013.01); *F25B 2700/1933* (2013.01); *F25B 2700/21152* (2013.01)

MULTI-SPLIT SYSTEM AND LIQUID RETURN PREVENTION CONTROL METHOD THEREOF DURING DEFROSTING OF MULTI-SPLIT SYSTEM

CROSS-REFERENCE TO RELATED APPLICATIONS

This application is a continuation of International Application PCT/CN2017/084224, filed May 12, 2017, which claims the priority of Chinese Patent Application No. 201610978531.7, filed with the State Intellectual Property Office of P. R. China on Nov. 7, 2016, the entire content of which are incorporated herein by reference.

TECHNICAL FIELD

The present disclosure relates to a field of air conditioners, and more particularly to a control method of anti-liquid-return of a multi-split air conditioning system during defrosting and a multi-split air conditioning system.

BACKGROUND

The multi-split air conditioning system is generally used for cooling and heating in the four seasons. When the multi-split air conditioning system works in a heating mode, the system transfers heat from outside to inside. The outdoor heat exchanger operates as an evaporator, the indoor heat exchanger operates as a condenser, and the compressor is used to discharge gas at a high temperature to exchange heat with indoor air. The gas transfers the heat to the indoor air and thus is condensed as a fluid. The fluid is returned to the outdoor unit through a throttling device, and is evaporated after heat exchange with outdoor air.

When the ambient temperature of the outdoor unit is below the freezing point, the water vapor in the outdoor air is condensed on the surface of the evaporator and becomes frost. The frosting of the evaporator increases the resistance of the heat transfer between the surface and the air and increases the flow resistance, such that the air flow rate of the evaporator is reduced and the heat exchange efficiency is significantly reduced, resulting in a reduced capacity of the heat exchange between the outdoor environment and the refrigerant and a decreased outlet air temperature. Especially in some low temperature and high humidity conditions, the outdoor heat exchanger is severely frosted, and the evaporation effect of the refrigerant in the outdoor heat exchanger is gradually deteriorated, such that more liquid refrigerant is gradually returned to the low-pressure gas-liquid separator, and the working condition of the system is deteriorated, causing a liquid return problem of the system when severe deterioration happens. Therefore, defrosting measures should be taken in due course when the multi-split air conditioning system works in the heating mode.

In the current defrosting manner, a four-way valve is used to switch the system to a refrigerating mode, such that the outdoor heat exchanger is converted to a condenser, the indoor unit is converted to an evaporator, and the outdoor heat exchanger is defrosted due to a high-temperature gaseous refrigerant from the compressor. However, due to a large amount of refrigerant of the multi-split air conditioning system and a relative long distance between the outdoor unit and the indoor unit, the amount of additional refrigerant in the system is also large. In the heating mode and the main heating mode, when the outer working conditions are relatively poor, the outdoor heat exchanger is frosted very quickly. Especially under the conditions of low temperature and high humidity, like snow and ice, the evaporation effect of the outdoor heat exchanger becomes worse. The refrigerant is gradually stored in a fluid reservoir of the compressor, i.e., the low-pressure gas-liquid separator, and occupies most of the volume of the low-pressure gas-liquid separator, and thus liquid level of the low-pressure gas-liquid separator is relative high before the defrosting starts. When the four-way valve is switched for the first time, the system is switched to a refrigerating mode in a reverse cycle, and the liquid refrigerant in the indoor units and the channel part may be instantaneously returned to the low-pressure gas-liquid separator at an inlet of the compressor, thus causing a risk of liquid return to the compressor. Therefore, it is difficult for current multi-split air conditioning systems to perform defrosting under the premise of ensuring the safe and reliable operation of the system.

SUMMARY

Embodiments of the present disclosure seek to solve at least one of the problems existing in the related art to at least some extent. Accordingly, an embodiment of the present disclosure is to provide a control method of anti-liquid-return of a multi-split air conditioning system during defrosting, which may prevent liquid return during defrosting and improve safety and reliability of the system.

Another embodiment of the present disclosure is to provide a multi-split air conditioning system.

One embodiment of the present disclosure provide a control method of anti-liquid-return of a multi-split air conditioning system during defrosting, in which the multi-split air conditioning system includes an outdoor unit, a shunt device and a plurality of indoor units, in which the shunt device includes a first heat exchanging component, a second heat exchanging component, a throttling element disposed between an outlet of a first heat exchanging channel of the second heat exchanging component and an inlet of a second heat exchanging channel of the second heat exchanging component, an outlet of a first heat exchanging channel of the first heat exchanging component is communicated with an inlet of the first heat exchanging channel of the second heat exchanging component, an inlet of a second heat exchanging channel of the first heat exchanging component is communicated with an outlet of the second heat exchanging channel of the second heat exchanging component, an outlet of the second heat exchanging channel of the first heat exchanging component is communicated with the outdoor unit, the outdoor unit comprises a compressor and a four-way valve. The method includes: detecting a gas discharge pressure, a gas return pressure and a gas discharge temperature of the compressor in real time when the multi-split air conditioning system works in a heating mode; sending a defrosting signal to the shunt device and a plurality of indoor heating units in the indoor units if a defrosting instruction is received by the outdoor unit, controlling the throttling element to close for a pre-set period by the shunt device to reduce an amount of a refrigerant returned to the outdoor unit before the four-way valve switches for a first time, and adjusting an open degree of the throttling element according to the gas discharge pressure, the gas return pressure and the gas discharge temperature when the multi-split air conditioning system works in a defrosting mode.

With the control method of anti-liquid-return of a multi-split air conditioning system during defrosting according to embodiments of the present disclosure, when the multi-split air conditioning system works in the heating mode, if the defrosting instruction is received, the throttling element is closed for the pre-set period by the shunt device to reduce the amount of the refrigerant returned to the outdoor unit before the four-way valve switches for the first time, and the open degree of the throttling element is adjusted according to the gas discharge pressure, the gas return pressure and the gas discharge temperature when the multi-split air conditioning system works in a defrosting mode. Therefore, it is ensured that the defrosting may be performed efficiently, and it also avoids the risk of liquid return to the compressor, thus improving safety and reliability of the system.

In addition, the control method of anti-liquid-return of a multi-split air conditioning system during defrosting according to above embodiment of the present disclosure may also have following additional technical features.

In one embodiment, adjusting an open degree of the throttling element according to the gas discharge pressure, the gas return pressure and the gas discharge temperature when the multi-split air conditioning system works in a defrosting mode includes: determining the gas discharge pressure, the gas return pressure and the gas discharge temperature respectively; controlling the throttling element to increase a pre-set open degree by the shunt device when the gas discharge pressure is higher than or equal to a first high pressure threshold and lower than a third high pressure threshold, the gas return pressure is lower than a first low pressure threshold and higher than or equal to a third low pressure threshold, or the gas discharge temperature is higher than or equal to a first temperature threshold and lower than a third temperature threshold; controlling the throttling element to decrease the pre-set open degree by the shunt device when the gas discharge pressure is lower than a second high pressure threshold, the gas return pressure is higher than or equal to a second low pressure threshold, and the gas discharge temperature is lower than a second temperature threshold, in which the first high pressure threshold is greater than the second high pressure threshold and smaller than the third high pressure threshold, the first low pressure threshold is greater than the third low pressure threshold and smaller than the second low pressure threshold, and the first temperature threshold is greater than the second temperature threshold and smaller than the third temperature threshold; controlling the throttling element to open to a pre-set maximal open degree by the shunt device when the gas discharge pressure is higher than or equal to the third high pressure threshold, the gas return pressure is lower than the third low pressure threshold, or the gas discharge temperature is higher than or equal to the third temperature threshold Further, an electric control valve is provided between the outlet of the first heat exchanging channel of the second heat exchanging component and the outlet of the second heat exchanging channel of the first heat exchanging component, and the shunt device is configured to control the throttling element to close for a pre-set period before the four-way valve switches for the first time, and when the multi-split air conditioning system works in a defrosting mode, the shunt device is configured to control the electric control valve to remain closed if the gas discharge pressure is higher than or equal to the first high pressure threshold and lower than the third high pressure threshold, the gas return pressure is lower than the first low pressure threshold and higher than or equal to the third low pressure threshold, or the gas discharge temperature is higher than or equal to the first temperature threshold and lower than the third temperature threshold; the shunt device is configured to continuously control the electric control valve to remain closed if the gas discharge pressure is lower than the second high pressure threshold, the gas return pressure is higher than or equal to the second low pressure threshold, and the gas discharge temperature is lower than the second temperature threshold; the shunt device is configured to control the electric control valve to open if the gas discharge pressure is higher than or equal to the third high pressure threshold, the gas return pressure is lower than the third low pressure threshold, or the gas discharge temperature is higher than or equal to the third temperature threshold.

In an embodiment of the present disclosure, the throttling element is an electronic expansion valve and the electric control valve is an electromagnetic valve.

In an embodiment of the present disclosure, the multi-split air conditioning system is in a main heating mode or a pure heating mode when the multi-split air conditioning system works in a heating mode.

In addition, embodiments of the present disclosure provide a non-transitory computer-readable storage medium having stored therein computer programs that, when executed by a processor, cause the processor to perform a control method of anti-liquid-return described above.

Another embodiment of the present disclosure provide a multi-split air conditioning system including a plurality of indoor units; an outdoor unit including a compressor and a four-way valve; a shunt device including a first heat exchanging component, a second heat exchanging component, a throttling element disposed between an outlet of a first heat exchanging channel of the second heat exchanging component and an inlet of a second heat exchanging channel of the second heat exchanging component, in which an outlet of a first heat exchanging channel of the first heat exchanging component is communicated with an inlet of the first heat exchanging channel of the second heat exchanging component, an inlet of a second heat exchanging channel of the first heat exchanging component is communicated with an outlet of the second heat exchanging channel of the second heat exchanging component, an outlet of the second heat exchanging channel of the first heat exchanging component is communicated with the outdoor unit; a detecting device configured to detect a gas discharge pressure, a gas return pressure and a gas discharge temperature of the compressor in real time when the multi-split air conditioning system works in a heating mode; in which the outdoor unit is configured to send a defrosting signal to the shunt device and a plurality of indoor heating machines in the indoor units when a defrosting instruction is received by the outdoor unit, the shunt device is configured to control the throttling element to close for a pre-set period to reduce an amount of a refrigerant returned to the outdoor unit before the four-way valve switches for a first time, and an open degree of the throttling element is adjusted according to the gas discharge pressure, the gas return pressure and the gas discharge temperature when the multi-split air conditioning system works in a defrosting mode.

With the multi-split air conditioning system according to embodiments of the present disclosure, when the multi-split air conditioning system works in the heating mode, if the defrosting instruction is received by the outdoor unit, the shunt device may control the throttling element to close for the pre-set period to reduce the amount of the refrigerant returned to the outdoor unit before the four-way valve switches for the first time, and the open degree of the throttling element is adjusted according to the gas discharge pressure, the gas return pressure and the gas discharge temperature when the multi-split air conditioning system works in a defrosting mode. Therefore, it is ensured that the defrosting may be performed efficiently, and it is also avoid the risk of liquid return to the compressor, thus improving safety and reliability of the system.

In addition, the multi-split air conditioning system according to above embodiment of the present disclosure may also have following additional technical features.

In one embodiment, the shunt device is configured to determine the gas discharge pressure, the gas return pressure and the gas discharge temperature respectively, in which the shunt device is configured to control the throttling element to increase a pre-set open degree when the gas discharge pressure is higher than or equal to a first high pressure threshold and lower than a third high pressure threshold, the gas return pressure is lower than a first low pressure threshold and higher than or equal to a third low pressure threshold, or the gas discharge temperature is higher than or equal to a first temperature threshold and lower than a third temperature threshold; the shunt device is configured to control the throttling element to decrease the pre-set open degree when the gas discharge pressure is lower than a second high pressure threshold, the gas return pressure is higher than or equal to a second low pressure threshold, and the gas discharge temperature is lower than a second temperature threshold, in which the first high pressure threshold is greater than the second high pressure threshold and smaller than the third high pressure threshold, the first low pressure threshold is greater than the third low pressure threshold and smaller than the second low pressure threshold, and the first temperature threshold is greater than the second temperature threshold and smaller than the third temperature threshold; the shunt device is configured to control the throttling element to open to a pre-set maximal open degree when the gas discharge pressure is higher than or equal to the third high pressure threshold, the gas return pressure is lower than the third low pressure threshold, or the gas discharge temperature is higher than or equal to the third temperature threshold.

Further, an electric control valve is provided between the outlet of the first heat exchanging channel of the second heat exchanging component and the outlet of the second heat exchanging channel of the first heat exchanging component, in which the shunt device is configured to control the throttling element to close for a pre-set period before the four-way valve switches for the first time, and when the multi-split air conditioning system works in a defrosting mode, the shunt device is configured to control the electric control valve to remain closed if the gas discharge pressure is higher than or equal to the first high pressure threshold and lower than the third high pressure threshold, the gas return pressure is lower than the first low pressure threshold and higher than or equal to the third low pressure threshold, or the gas discharge temperature is higher than or equal to the first temperature threshold and lower than the third temperature threshold; the shunt device is configured to continuously control the electric control valve to remain closed if the gas discharge pressure is lower than the second high pressure threshold, the gas return pressure is higher than or equal to the second low pressure threshold, and the gas discharge temperature is lower than the second temperature threshold; the shunt device is configured to control the electric control valve to open if the gas discharge pressure is higher than or equal to the third high pressure threshold, the gas return pressure is lower than the third low pressure threshold, or the gas discharge temperature is higher than or equal to the third temperature threshold.

In an embodiment of the present disclosure, the throttling element is an electronic expansion valve and the electric control valve is an electromagnetic valve.

In an embodiment of the present disclosure, the multi-split air conditioning system is in a main heating mode or a pure heating mode when the multi-split air conditioning system works in a heating mode.

DETAILED DESCRIPTION

Figure 1:
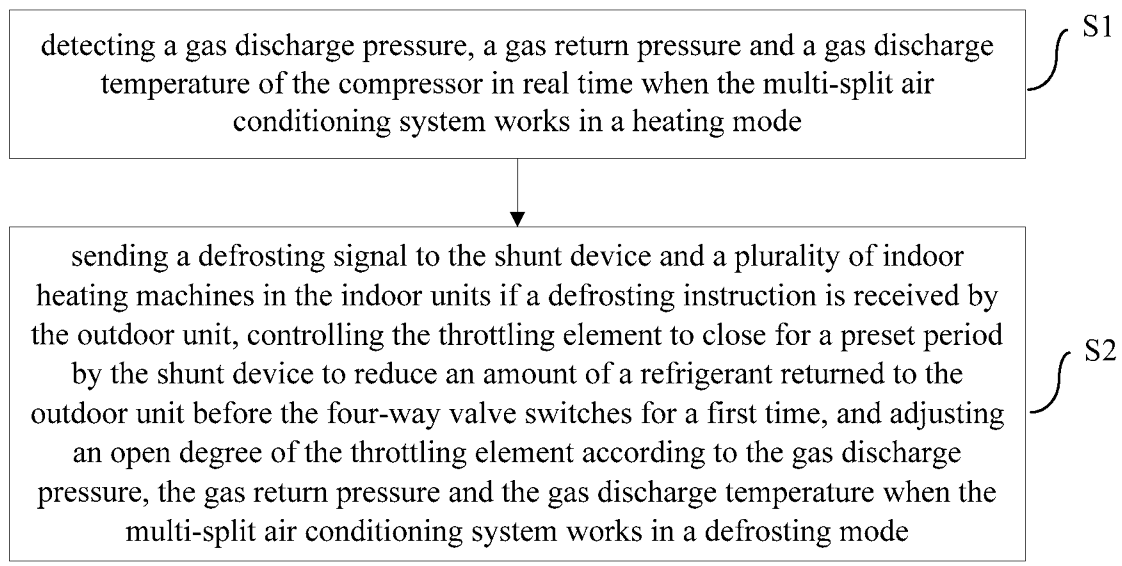
FIG. 1 is a flow chart of a control method of anti-liquid-return of a multi-split air conditioning system during defrosting according to an embodiment of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

Hereinafter, a control method of anti-liquid-return of a multi-split air conditioning system during defrosting according to embodiments of the present disclosure will be described with reference to the accompanying drawings.

FIG. 1 is a flow chart of a control method of anti-liquid-return of a multi-split air conditioning system during defrosting according to an embodiment of the present disclosure.

Figure 2:
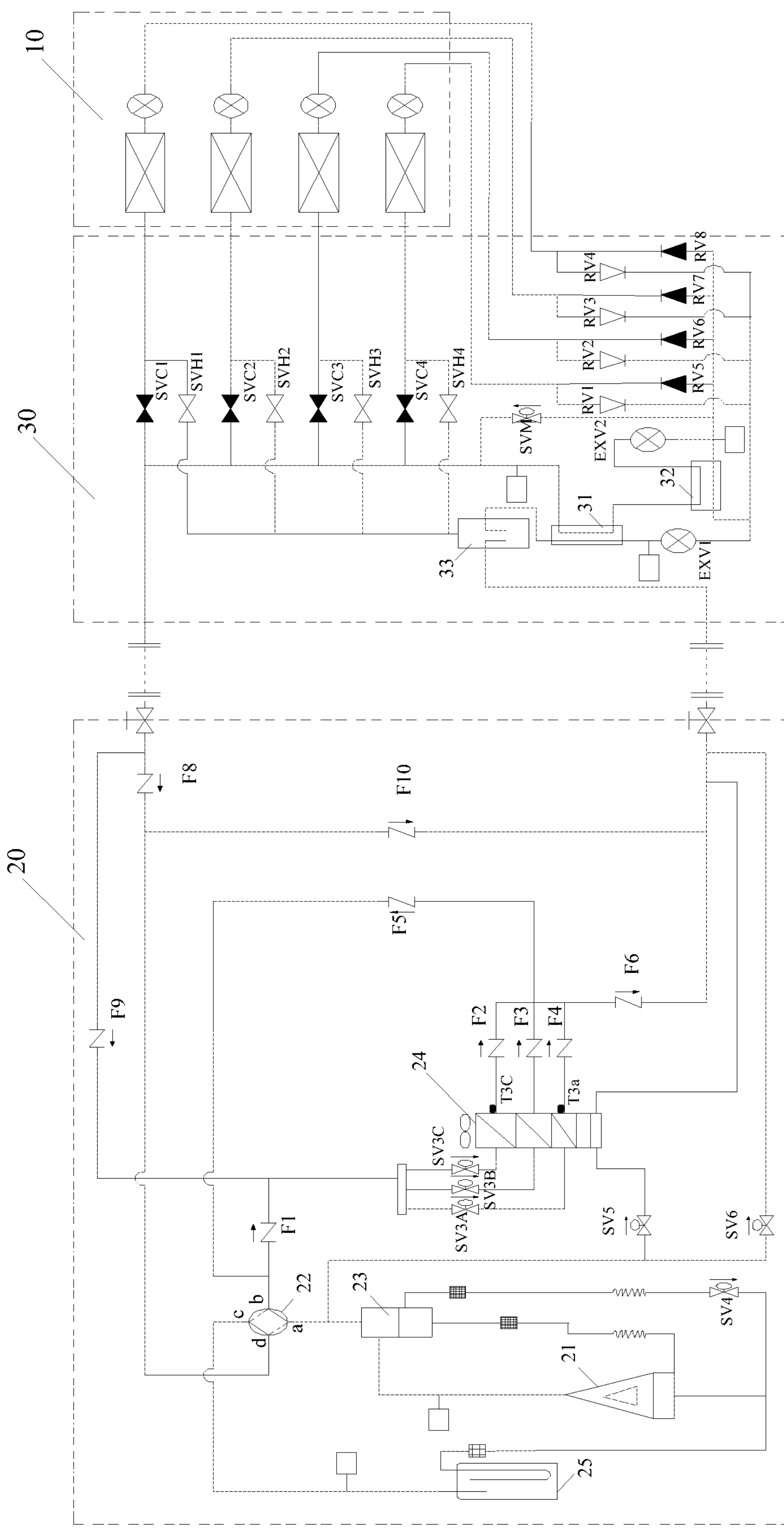
FIG. 2 is a schematic diagram of a multi-split air conditioning system according to an embodiment of the present disclosure.

In one embodiment, it can be seen from FIG. 2, the multi-split air conditioning system according to an embodiment of the present disclosure may include an outdoor unit, a shunt device and a plurality of indoor units, in which the shunt device includes a first heat exchanging component, a second heat exchanging component, a throttling element EXV2 disposed between an outlet of a first heat exchanging channel of the second heat exchanging component and an inlet of a second heat exchanging channel of the second heat exchanging component, an outlet of a first heat exchanging channel of the first heat exchanging component is communicated with an inlet of the first heat exchanging channel of the second heat exchanging component, an inlet of a second heat exchanging channel of the first heat exchanging component is communicated with an outlet of the second heat exchanging channel of the second heat exchanging component, an outlet of the second heat exchanging channel of the first heat exchanging component is communicated with the outdoor unit, the outdoor unit includes a compressor and a four-way valve. In one embodiment of the present disclosure, the throttling element EXV2 is an electronic expansion valve.

As shown in FIG. 1, the control method of anti-liquid-return of a multi-split air conditioning system during defrosting may include following steps.

At S1, when the multi-split air conditioning system works in a heating mode, a gas discharge pressure, a gas return pressure and a gas discharge temperature of the compressor are detected in real time.

At S2, a defrosting signal is sent to the shunt device and a plurality of indoor heating machines in the indoor units when a defrosting instruction is received by the outdoor unit, the throttling element is controlled to close for a pre-set period by the shunt device to reduce an amount of a refrigerant returned to the outdoor unit before the four-way valve switches for a first time, and an open degree of the throttling element is adjusted according to the gas discharge pressure, the gas return pressure and the gas discharge temperature when the multi-split air conditioning system works in a defrosting mode.

In an embodiment of the present disclosure, the multi-split air conditioning system is in a main heating mode or a pure heating mode when the multi-split air conditioning system works in a heating mode.

In one embodiment, as shown in FIG. 2, the multi-split air conditioning system includes for example four indoor units, and works in a pure heating mode. When the multi-split air conditioning system works in the pure heating mode, a first port a is communicated with a fourth port d and a second port b is communicated with a third port c in the four-way valve.

High-temperature and high-pressure gaseous refrigerant from an outlet of the compressor passes through an oil separator, a four-way valve and a one-way valve F10 and enters a high-pressure gas-liquid separator of the shunt device, and then passes through heating electromagnetic valves SVH1-SVH4 into the indoor units for heating. Liquid refrigerant from an outlet of the indoor units flows through a second heat exchanging component, a throttling element EXV2 and a first heat exchanging component via the one-way valves RV1-RV4, and then enters the outdoor heat exchanger via a one-way valve F9 to be evaporated. After being evaporated by the outdoor heat exchanger, the refrigerant can enter the low-pressure gas-liquid separator of the outdoor unit via a one-way valve F5 and the four-way valve so as to return to the compressor.

When the multi-split air conditioning system works in a defrosting mode, the flow path of the refrigerant in the multi-split is similar to that when the multi-split air conditioning system works in a refrigerating mode. A pure refrigerating mode is taken as an example, as shown in FIG. 2, the four-way valve is switched for the first time, the first port a is communicated with the second port b, and the fourth port d is communicated with the third port c. The high-temperature and high-pressure gaseous refrigerant from the outlet of the compressor passes through the oil separator and the four-way valve, and then passes through a one-way valve F1, so as to directly enter the outdoor heat exchanger to defrost the outdoor heat exchanger. Subsequently, most of the refrigerant enters the high-pressure gas-liquid separator of the throttling device via a one-way valve F6, and then enters the indoor units through the first heat exchanging component, another throttling element EXV1, the second heat exchanging component, and one-way valves RV5-RV8, followed by being back to the outdoor unit via cooling electromagnetic valves SVC1-SVC4. A part of the refrigerant is returned to the outdoor unit via the throttling element EXV2. In one embodiment, in the outdoor unit, the refrigerant may enter the low-pressure gas-liquid separator via a one-way valve F8 and the four-way valve to return to the compressor.

In an embodiment of the present disclosure, the throttling element is controlled to close for the pre-set period before the four-way valve switches for the first time, such that the amount of refrigerant entering the low-pressure gas-liquid separator of the outdoor unit can be reduced to prevent that excessive refrigerant in the low-pressure gas-liquid separator returns to the compressor, which may cause compression of the liquid in the compressor.

When the multi-split air conditioning system works in a defrosting mode, a gas discharge pressure PC, a gas return pressure PE and a gas discharge temperature TP may be determined respectively.

The throttling element EXV2 is controlled by the shunt device to increase a pre-set open degree when the gas discharge pressure PC is higher than or equal to a first high pressure threshold A1 and lower than a third high pressure threshold A3, the gas return pressure PE is lower than a first low pressure threshold B1 and higher than or equal to a third low pressure threshold B3, or the gas discharge temperature TP is higher than or equal to a first temperature threshold C1 and lower than a third temperature threshold C3.

The throttling element EXV2 is controlled by the shunt device to decrease the pre-set open degree when the gas discharge pressure PC is lower than a second high pressure threshold A2, the gas return pressure PE is higher than or equal to a second low pressure threshold B2, and the gas discharge temperature TP is lower than a second temperature threshold C2.

The throttling element EXV2 is controlled by the shunt device to open to a pre-set maximal open degree when the gas discharge pressure PC is higher than or equal to the third high pressure threshold A3, the gas return pressure PE is lower than the third low pressure threshold B3, or the gas discharge temperature TP is higher than or equal to the third temperature threshold C3. In one embodiment, the first high pressure threshold A1 is greater than the second high pressure threshold A2 and smaller than the third high pressure threshold A3, the first low pressure threshold B1 is greater than the third low pressure threshold B3 and smaller than the second low pressure threshold B2, and the first temperature threshold C1 is greater than the second temperature threshold C2 and smaller than the third temperature threshold C3.

In one embodiment, values of A1-A3, B1-B3 and C1-C3 may be set according to conditions such as the amount of the refrigerant in the multi-split air conditioning system, the performance of the compressor and the specification of the low-pressure gas-liquid separator.

When the multi-split air conditioning system works in the defrosting mode, the open degree of the throttling element EXV2 may be adjusted continuously according to the gas discharge pressure, the gas return pressure and the gas discharge temperature until the defrosting is completed. By controlling the throttling element EXV2 to reduce the open degree, it is possible to prevent the refrigerant amount from being excessively large and the compressor from being filled with the returned liquid. By controlling the throttling element EXV2 to increase the open degree, it is possible to prevent the refrigerant amount from being excessively small and the compressor from lacking the refrigerant, and it is also possible to increases a defrosting rate.

In addition, as shown in FIG. 2, in an embodiment of the present disclosure, an electric control valve SVM is provided between the outlet of the first heat exchanging channel of the second heat exchanging component and the outlet of the second heat exchanging channel of the first heat exchanging component. In one embodiment, the electric control valve SVM is an electromagnetic valve. When the multi-split air conditioning system works in the heating mode, liquid refrigerant from the outlet of the indoor units flows through the second heat exchanging component and the electric control valve SVM via the one-way valves RV1-RV4, and then enters the outdoor heat exchanger via the one-way valve F9. During defrosting, a part of the refrigerant returns to the outdoor unit via the electric control valve SVM. Therefore, the amount of the refrigerant can be controlled by controlling the electric control valve SVM.

In one embodiment, in an embodiment of the present disclosure, the electric control valve SVM is controlled to close for the pre-set period before the four-way valve switches for the first time. When the multi-split air conditioning system works in the defrosting mode, the shunt device is configured to control the electric control valve SVM to remain closed if the gas discharge pressure PC is higher than or equal to the first high pressure threshold A1 and lower than the third high pressure threshold A3, the gas return pressure PE is lower than the first low pressure threshold B1 and higher than or equal to the third low pressure threshold B3, or the gas discharge temperature TP is higher than or equal to the first temperature threshold C1 and lower than the third temperature threshold C3; the shunt device is configured to continuously control the electric control valve SVM to remain closed if the gas discharge pressure PC is lower than the second high pressure threshold A2, the gas return pressure PE is higher than or equal to the second low pressure threshold B2, and the gas discharge temperature TP is lower than the second temperature threshold C2; the shunt device is configured to control the electric control valve SVM to open if the gas discharge pressure PC is higher than or equal to the third high pressure threshold A3, the gas return pressure PE is lower than the third low pressure threshold B3, or the gas discharge temperature TP is higher than or equal to the third temperature threshold C3.

In other words, in the multi-split air conditioning system including the electric control valve SVM, the throttling element EXV2 and the electric control valve SVM may be controlled simultaneously according to results of determining the gas discharge pressure, the gas return pressure and the gas discharge temperature described above, such that the refrigerant amount in the low-pressure gas-liquid separator may be controlled by controlling the flow rate of the refrigerant, so as to prevent the refrigerant amount from being excessively large or small.

In addition, embodiments of the present disclosure provide a non-transitory computer-readable storage medium having stored therein computer programs that, when executed by a processor, cause the processor to perform a control method of anti-liquid-return described as above.

With the control method of anti-liquid-return of a multi-split air conditioning system during defrosting according to embodiments of the present disclosure, when the multi-split air conditioning system works in the heating mode, if the defrosting instruction is received, the throttling element is closed for the pre-set period by the shunt device to reduce the amount of the refrigerant returned to the outdoor unit before the four-way valve switches for the first time, and the open degree of the throttling element is adjusted according to the gas discharge pressure, the gas return pressure and the gas discharge temperature when the multi-split air conditioning system works in the defrosting mode. Therefore, it is ensured that the defrosting may be performed efficiently, and it is also avoid the risk of liquid return to the compressor, thus improving safety and reliability of the system.

In order to realize the control method of anti-liquid-return of a multi-split air conditioning system during defrosting provided by above embodiments, embodiments of the present disclosure provide a multi-split air conditioning system.

As shown in FIG. 2, the multi-split air conditioning system according to the present disclosure includes a plurality of indoor units 10, an outdoor unit 20 and a shunt device 30.

In one embodiment, the outdoor unit 20 includes a compressor 21 and a four-way valve 22. The shunt device 30 includes a first heat exchanging component 31, a second heat exchanging component 32, a throttling element EXV2 disposed between an outlet of a first heat exchanging channel of the second heat exchanging component 32 and an inlet of a second heat exchanging channel of the second heat exchanging component 32, an outlet of a first heat exchanging channel of the first heat exchanging component 31 is communicated with an inlet of the first heat exchanging channel of the second heat exchanging component 32, an inlet of a second heat exchanging channel of the first heat exchanging component 31 is communicated with an outlet of the second heat exchanging channel of the second heat exchanging component 32, an outlet of the second heat exchanging channel of the first heat exchanging component 31 is communicated with the outdoor unit 20. In one embodiment, the throttling element EXV2 is an electronic expansion valve.

The multi-split air conditioning system according to embodiments of the present disclosure further includes a detecting device (not shown in FIG. 2). The detecting device is configured to detect a gas discharge pressure, a gas return pressure and a gas discharge temperature of the compressor 21 in real time when the multi-split air conditioning system works in a heating mode.

In an embodiment of the present disclosure, the outdoor unit 20 is configured to send a defrosting signal to the shunt device 30 and a plurality of indoor heating machines in the indoor units 10 when a defrosting instruction is received by the outdoor unit 20, the shunt device 30 is configured to control the throttling element EXV2 to close for a pre-set period to reduce an amount of a refrigerant returned to the outdoor unit 20 before the four-way valve 22 switches for a first time, and an open degree of the throttling element EXV2 is adjusted according to the gas discharge pressure, the gas return pressure and the gas discharge temperature when the multi-split air conditioning system works in a defrosting mode. In an embodiment of the present disclosure, each of the indoor units 10, the outdoor unit 20 and the shunt device 30 may have a respective controller for information exchange and system control. Alternatively, an integrated controller is provided to control the indoor units 10, the outdoor unit 20 and the shunt device 30.

In an embodiment of the present disclosure, the multi-split air conditioning system is in a main heating mode or a pure heating mode when the multi-split air conditioning system works in a heating mode.

In one embodiment, as shown in FIG. 2, the multi-split air conditioning system includes for example four indoor units 10, and works in a pure heating mode. When the multi-split air conditioning system works in the pure heating mode, a first port a is communicated with a fourth port d and a second port b is communicated with a third port c in the four-way valve 22. High-temperature and high-pressure gaseous refrigerant from an outlet of the compressor 21 passes through an oil separator 23, a four-way valve 22 and a one-way valve F10 and enters a high-pressure gas-liquid separator 33 of the shunt device 30, and then passes through heating electromagnetic valves SVH1-SVH4 respectively into the indoor units 10 for heating. Liquid refrigerant from an outlet of the indoor units 10 flows through a second heat exchanging component 32, a throttling element EXV2 and a first heat exchanging component 31 via the one-way valves RV1-RV4, and then enters the outdoor heat exchanger 24 of the outdoor unit 20 via a one-way valve F9 to be evaporated. After being evaporated by the outdoor heat exchanger 24, the refrigerant can enter the low-pressure gas-liquid separator 25 of the outdoor unit 20 via a one-way valve F5 and the four-way valve 22 so as to return to the compressor 21.

When the multi-split air conditioning system works in a defrosting mode, the flow path of the refrigerant in the multi-split is similar to that when the multi-split air conditioning system works in a refrigerating mode. A pure refrigerating mode is taken as an example, as shown in FIG. 2, the four-way valve 22 is switched for the first time, the first port a is communicated with the second port b, and the fourth port d is communicated with the third port c. The high-temperature and high-pressure gaseous refrigerant from the outlet of the compressor 21 passes through the oil separator 23 and the four-way valve 22, and then passes through a one-way valve F1, so as to directly enter the outdoor heat exchanger 24 to defrost the outdoor heat exchanger 24. Subsequently, most of the refrigerant enters the high-pressure gas-liquid separator of the throttling device 30 via a one-way valve F6, and then enters the indoor units 10 through the first heat exchanging component 31, another throttling element EXV1, the second heat exchanging component 32, and one-way valves RV5-RV8, followed by being back to the outdoor unit 20 via cooling electromagnetic valves SVC1-SVC4. A part of the refrigerant is returned to the outdoor unit 20 via the throttling element EXV2. In one embodiment, in the outdoor unit 20, the refrigerant may enter the low-pressure gas-liquid separator 25 via a one-way valve F8 and the four-way valve 22 to return to the compressor 21.

In an embodiment of the present disclosure, the throttling element EXV2 is controlled to close for the pre-set period by the shunt device 30 before the four-way valve 22 switches for the first time, such that the amount of refrigerant entering the low-pressure gas-liquid separator 25 of the outdoor unit 20 can be reduced to prevent that excessive refrigerant in the low-pressure gas-liquid separator 25 returns to the compressor 21, which may cause compression of the liquid in the compressor 21.

When the multi-split air conditioning system works in a defrosting mode, a gas discharge pressure PC, a gas return pressure PE and a gas discharge temperature TP may be determined respectively by the shunt device 30. The throttling element EXV2 is controlled by the shunt device 30 to increase a pre-set open degree when the gas discharge pressure PC is higher than or equal to a first high pressure threshold A1 and lower than a third high pressure threshold A3, the gas return pressure PE is lower than a first low pressure threshold B1 and higher than or equal to a third low pressure threshold B3, or the gas discharge temperature TP is higher than or equal to a first temperature threshold C1 and lower than a third temperature threshold C3. The throttling element EXV2 is controlled by the shunt device 30 to decrease the pre-set open degree when the gas discharge pressure PC is lower than a second high pressure threshold A2, the gas return pressure PE is higher than or equal to a second low pressure threshold B2, and the gas discharge temperature TP is lower than a second temperature threshold C2. The throttling element EXV2 is controlled by the shunt device 30 to open to a pre-set maximal open degree when the gas discharge pressure PC is higher than or equal to the third high pressure threshold A3, the gas return pressure PE is lower than the third low pressure threshold B3, or the gas discharge temperature TP is higher than or equal to the third temperature threshold C3. In one embodiment, the first high pressure threshold A1 is greater than the second high pressure threshold A2 and smaller than the third high pressure threshold A3, the first low pressure threshold B1 is greater than the third low pressure threshold B3 and smaller than the second low pressure threshold B2, and the first temperature threshold C1 is greater than the second temperature threshold C2 and smaller than the third temperature threshold C3. The open degree of the throttling element EXV2 is accordingly adjusted until the defrosting is completed.

In one embodiment, values of A1-A3, B1-B3 and C1-C3 may be set according to conditions such as the amount of the refrigerant in the multi-split air conditioning system, the performance of the compressor 21 and the specification of the low-pressure gas-liquid separator 25.

Accordingly, when the multi-split air conditioning system works in the defrosting mode, the open degree of the throttling element EXV2 may be adjusted continuously by the shunt device 30 according to the gas discharge pressure, the gas return pressure and the gas discharge temperature until the defrosting is completed. By controlling the throttling element EXV2 to reduce the open degree, it is possible to prevent the refrigerant amount from being excessively large and the compressor from being filled with the returned liquid. By controlling the throttling element EXV2 to increase the open degree, it is possible to prevent the refrigerant amount from being excessively small and the compressor 21 from lacking the refrigerant, and it is also possible to increases a defrosting rate.

In addition, as shown in FIG. 2, in an embodiment of the present disclosure, an electric control valve SVM is provided between the outlet of the first heat exchanging channel of the second heat exchanging component 32 and the outlet of the second heat exchanging channel of the first heat exchanging component 31. In one embodiment, the electric control valve SVM is an electromagnetic valve. When the multi-split air conditioning system works in the heating mode, liquid refrigerant from the outlet of the indoor units 10 flows through the second heat exchanging component 32 and the electric control valve SVM via the one-way valves RV1-RV4, and then enters the outdoor heat exchanger of the outdoor unit 20 via the one-way valve F9. During defrosting, a part of the refrigerant returns to the outdoor unit 20 via the electric control valve SVM. Therefore, the amount of the refrigerant can be controlled by controlling the electric control valve SVM.

In one embodiment, in an embodiment of the present disclosure, the electric control valve SVM is controlled by the shunt device 30 to close for the pre-set period before the four-way valve 22 switches for the first time. When the multi-split air conditioning system works in the defrosting mode, the shunt device 30 is configured to control the electric control valve SVM to remain closed if the gas discharge pressure PC is higher than or equal to the first high pressure threshold A1 and smaller than the third high pressure threshold A3, the gas return pressure PE is lower than the first low pressure threshold B1 and higher than or equal to the third low pressure threshold B3, or the gas discharge temperature TP is higher than or equal to the first temperature threshold C1 and lower than the third temperature threshold C3; the shunt device 30 is configured to continuously control the electric control valve SVM to remain closed if the gas discharge pressure PC is lower than the second high pressure threshold A2, the gas return pressure PE is higher than or equal to the second low pressure threshold B2, and the gas discharge temperature TP is lower than the second temperature threshold C2; the shunt device 30 is configured to control the electric control valve SVM to open if the gas discharge pressure PC is higher than or equal to the third high pressure threshold A3, the gas return pressure PE is lower than the third low pressure threshold B3, or the gas discharge temperature TP is higher than or equal to the third temperature threshold C3.

In other words, in the multi-split air conditioning system including the electric control valve, the throttling element EXV2 and the electric control valve SVM may be controlled simultaneously according to results of determining the gas discharge pressure, the gas return pressure and the gas discharge temperature described above, such that the refrigerant amount in the low-pressure gas-liquid separator may be controlled by controlling the flow rate of the refrigerant, so as to prevent the refrigerant amount from being excessively large or small.

With the multi-split air conditioning system according to embodiments of the present disclosure, when the multi-split air conditioning system works in the heating mode, if the defrosting instruction is received by the outdoor unit, the shunt device may control the throttling element to close for the pre-set period to reduce the amount of the refrigerant returned to the outdoor unit before the four-way valve switches for the first time, and the open degree of the throttling element is adjusted according to the gas discharge pressure, the gas return pressure and the gas discharge temperature when the multi-split air conditioning system works in a defrosting mode. Therefore, it is ensured that the defrosting may be performed efficiently, and it is also avoid the risk of liquid return to the compressor, thus improving safety and reliability of the system.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counter clockwise" should be construed to refer to the orientation as described or as shown in the drawings under discussion. These relative terms are for convenience of description and do not require that the present disclosure be constructed or operated in a particular orientation, and thus shall not be construed to limit the present disclosure In addition, terms such as "first" and "second" are used herein for purposes of description and are not intended to indicate or imply relative importance or significance or to imply the number of indicated technical features. Thus, the feature defined with "first" and "second" may include one or more of this feature(s). In the description of the present disclosure, unless specified otherwise, "a plurality of" means two or more.

In the present disclosure, unless specified or limited otherwise, the terms "mounted", "communicated", "coupled," "fixed" and the like are used broadly, and may be, for example, fixed connections, detachable connections, or integral connections; may also be mechanical or electrical connections; may also be direct connections or indirect connections via intervening structures; may also be inner communications of two elements.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, architecture, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, architectures, materials, or characteristics may be combined in any suitable manner in one or more embodiments or examples.

What is claimed is:

1. A control method of anti-liquid-return of a multi-split air conditioning system during defrosting, wherein the multi-split air conditioning system comprises an outdoor unit, a shunt assembly and a plurality of indoor units, wherein the shunt assembly comprises a first heat exchanger, a second heat exchanger, a throttling valve disposed between an outlet of a first heat exchanging channel of the second heat exchanger and an inlet of a second heat exchanging channel of the second heat exchanger, an outlet of a first heat exchanging channel of the first heat exchanger is communicated with an inlet of the first heat exchanging channel of the second heat exchanger, an inlet of a second heat exchanging channel of the first heat exchanger is communicated with an outlet of the second heat exchanging channel of the second heat exchanger, an outlet of the second heat exchanging channel of the first heat exchanger is communicated with the outdoor unit, the outdoor unit comprises a compressor and a four-way valve;

the method comprises:

- detecting a gas discharge pressure, a gas return pressure and a gas discharge temperature of the compressor in real time in response to the multi-split air conditioning system working in a heating mode;
- sending a defrosting signal to the shunt assembly and a plurality of indoor heating machines in the indoor units in response to a defrosting instruction received by the outdoor unit;
- controlling the throttling valve to close for a pre-set period by the shunt assembly to reduce an amount of a refrigerant returned to the outdoor unit before the four-way valve switches for a first time; and
- adjusting an open degree of the throttling valve according to the gas discharge pressure, the gas return pressure and the gas discharge temperature in response to the multi-split air conditioning system working in a defrosting mode.

2. The method according to claim 1, wherein the adjusting an open degree of the throttling valve according to the gas discharge pressure, the gas return pressure and the gas discharge temperature in response to the multi-split air conditioning system working in a defrosting mode comprises:

- determining the gas discharge pressure, the gas return pressure and the gas discharge temperature respectively;

controlling the throttling valve to increase a pre-set open degree by the shunt assembly in response to the gas discharge pressure being higher than or equal to a first high pressure threshold and lower than a third high pressure threshold, the gas return pressure being lower than a first low pressure threshold and higher than or equal to a third low pressure threshold, or the gas discharge temperature being higher than or equal to a first temperature threshold and lower than a third temperature threshold;

controlling the throttling valve to decrease the pre-set open degree by the shunt assembly in response to the gas discharge pressure being lower than a second high pressure threshold, the gas return pressure being higher than or equal to a second low pressure threshold, and the gas discharge temperature being lower than a second temperature threshold, wherein the first high pressure threshold is greater than the second high pressure threshold and smaller than the third high pressure threshold, the first low pressure threshold is greater than the third low pressure threshold and smaller than the second low pressure threshold, and the first temperature threshold is greater than the second temperature threshold and smaller than the third temperature threshold; and controlling the throttling valve to open to a pre-set maximal open degree by the shunt assembly in response to the gas discharge pressure being higher than or equal to the third high pressure threshold, the gas return pressure being lower than the third low pressure threshold, or the gas discharge temperature being higher than or equal to the third temperature threshold.

3. The method according to claim 2, wherein an electric control valve is provided between the outlet of the first heat exchanging channel of the second heat exchanger and the outlet of the second heat exchanging channel of the first heat exchanger;

wherein the shunt assembly is configured to control the throttling element to close for a pre-set period before the four-way valve switches for the first time;

in response to the multi-split air conditioning system working in a defrosting mode, the shunt assembly is configured to control the electric control valve to remain closed in response to the gas discharge pressure being higher than or equal to the first high pressure threshold and lower than the third high pressure threshold, the gas return pressure being lower than the first low pressure threshold and higher than or equal to the third low pressure threshold, or the gas discharge temperature being higher than or equal to the first temperature threshold and lower than the third temperature threshold;

the shunt assembly is configured to continuously control the electric control valve to remain closed in response to the gas discharge pressure being lower than the second high pressure threshold, the gas return pressure being higher than or equal to the second low pressure threshold, and the gas discharge temperature being lower than the second temperature threshold; and the shunt assembly is configured to control the electric control valve to open in response to the gas discharge pressure being higher than or equal to the third high pressure threshold, the gas return pressure being lower than the third low pressure threshold, or the gas discharge temperature being higher than or equal to the third temperature threshold.

4. The method according to claim 2, wherein the throttling valve is an electronic expansion valve and the electric control valve is an electromagnetic valve.

5. The method according to claim 1, wherein the multi-split air conditioning system is in a main heating mode or a pure heating mode when the multi-split air conditioning system works in a heating mode.

* * * * *